United States Patent

Fogelberg

[11] Patent Number: 5,269,400
[45] Date of Patent: Dec. 14, 1993

[54] TRANSMISSION SYNCHRONIZER

[75] Inventor: Mark J. Fogelberg, Loveland, Ohio

[73] Assignee: Borg-Warner Automotive, Inc., Sterling Heights, Mich.

[21] Appl. No.: 963,875

[22] Filed: Oct. 20, 1992

[51] Int. Cl.⁵ .............................................. F16D 23/06
[52] U.S. Cl. .................. 192/53 F; 192/53 E; 192/53 G; 74/339
[58] Field of Search .................. 192/53 F, 53 E, 53 G; 74/339

[56] References Cited

U.S. PATENT DOCUMENTS

| | | | |
|---|---|---|---|
| 2,864,476 | 12/1958 | Ashauer et al. | 192/53 |
| 3,080,028 | 3/1963 | Kennedy | 192/53 |
| 3,247,937 | 4/1966 | Ivanchich | 192/53 F |
| 3,270,843 | 9/1966 | Ivanchich | 192/53 |
| 3,272,291 | 9/1966 | Flinn | 192/53 |
| 3,451,513 | 6/1969 | Altmann | 192/53 F |
| 3,523,598 | 8/1970 | Thom et al. | 74/339 X |
| 3,612,235 | 10/1971 | Ashauer et al. | 192/53 F |
| 3,795,293 | 3/1974 | Worner | 192/53 F |
| 3,804,218 | 4/1974 | Krutashov | 192/53 E |
| 4,132,298 | 1/1979 | F'Geppert | 192/53 B |
| 4,271,943 | 6/1981 | Kuzma | 192/53 F |
| 4,294,338 | 10/1981 | Simmons | 192/4 A |
| 4,299,317 | 11/1981 | Katayama | 192/53 F |
| 4,300,668 | 11/1981 | Nozawa et al. | 192/53 F |
| 4,314,627 | 2/1982 | Nozawa | 192/53 F |
| 4,315,564 | 2/1982 | Numazawa et al. | 192/53 F |
| 4,413,715 | 11/1983 | Michael et al. | 192/53 F |
| 4,478,321 | 10/1984 | De Franco et al. | 192/53 E |
| 4,566,568 | 1/1986 | Yant | 192/53 F |
| 4,660,707 | 4/1987 | Sadanori et al. | 192/53 F |
| 4,828,087 | 5/1989 | Kudo et al. | 192/53 F |
| 5,113,986 | 5/1992 | Frost | 74/339 X |

*Primary Examiner*—Leslie A. Braun
*Assistant Examiner*—Andrea Pitts
*Attorney, Agent, or Firm*—Brooks & Kushman

[57] ABSTRACT

A synchronizer assembly for use in manual transmissions for automotive vehicles wherein an internally splined hub is operatively connected to a driven rotary shaft, an internally splined clutch sleeve being rotatably connected to said hub by external splines on the hub and axially slidable thereon, a shift fork engaging and actuating said sleeve, one or more blocker rings located adjacent to the sides of said hub, and one or more transmission gears at the sides of said hub beyond said blocker rings, the gears and blocker rings having peripheral teeth adapted to be engaged by the splines on said clutch sleeve, the blocker rings and gears also having cooperating conical friction surfaces, respectively, the clutch sleeve having an interior annular groove centrally located therein and facing said hub to receive a generally circular wire spring, which spring, after some initial allowable travel of the sleeve, resists movement thereof and abuts projections extending inward from either blocker ring on movement of clutch sleeve in either direction.

20 Claims, 6 Drawing Sheets

TRANSMISSION SYNCHRONIZER

TECHNICAL FIELD

The invention disclosed herein relates to improvements in transmission synchronizers, such as those utilized in manual transmissions for automotive vehicles, wherein a simplified construction of the synchronizer eliminates numerous parts required by previous synchronizers.

BACKGROUND

A manual transmission for an automotive vehicle of the blocker ring type usually includes a plurality of struts and springs which served to preload, or seat, the blocker rings against a conical friction surface upon the initial movement of the synchronizer sleeve. More particularly, such synchronizer assemblies usually consist of an externally splined hub attached to a driven shaft, an internally splined collar or sleeve, slidably mounted on the hub and adapted to be moved axially by means of a shift fork or the like, and blocker rings and cooperating gear clutching elements on one or both sides of the synchronizer. Also, typically included in such an assembly is a plurality of bars, or struts, slidably mounted on the hub and arranged to contact the blocker rings upon initial axial movement to either side of a centered, or neutral, position. These struts are urged radially outward by one or more springs and include projections on their outer surfaces which engaged a groove formed on the inner diameter of the sleeve.

By means of this construction, the struts and springs accomplished a detenting function with the sleeve and thus tended to follow the sleeve upon axial movement thereof. As the struts contact the blocker ring, the ring becomes seated against its conical friction surface and is indexed to a proper position for synchronizer action. Further axial movement of the sleeve overcomes the detent force on the struts, compressing them radially against the springs, causes the internal spline teeth on the sleeve engine chamfers in the blocker ring teeth, thus increasing the frictional synchronizing force developed by the blocker ring. This finishes the synchronizing action in the conventional manner.

DISCLOSURE OF THE INVENTION

The present invention is an improvement over prior art synchronizers in that it replaces the collection of struts and springs within the synchronizer assembly with a single, generally circular wire spring centrally located in the hub and cooperating with a suitable facing groove or notch structure in the axially movable sleeve. A plurality of projections on the blocker ring extend axially inward through notches in the hub to a position in close proximity to the wire spring.

In a first embodiment of the invention, the hub is formed with a centrally located groove which receives the circular wire spring. The groove in the hub is for clearance only and is sufficiently wide to allow the wire spring to move axially a sufficient distance in either direction for proper synchronizer operation. The wire spring is discontinuous with one end bent inwardly to form a lug or tang. An additional notch in the hub cooperates with the tang to allow the spring to move axially, but rotation is prevented.

In assembly of the synchronizer, the wire spring is positioned generally within the groove in the hub and compressed radially inward, with the tang engaging the additional notch in the hub. The sleeve is then assembled axially over the hub and spring, the spring's preload causing it to snap into the internal groove structure in the sleeve.

In a second embodiment of the invention, the wire spring is a continuously circular wire. It therefore does not have an inwardly bent tang. Further, the additional notch in the hub is not required. In assembly of this embodiment, the continuous wire spring is locally engaged within the annular groove in the hub and elastically deformed upon assembly of the sleeve over the hub to allow the remainder of the spring to engage the annular groove in the sleeve. An alternate arrangement has a hub with a two-piece construction which, when assembled, defines the groove. In assembly, the continuous wire spring is placed in position. The first main hub portion, the second hub portion, is then assembled to the first hub portion and secured with a retaining ring or other suitable fastening means. The sleeve is then assembled axially in the usual manner.

Several configurations of wire springs are envisioned for the present invention; namely, a generally circular wire spring that is round in cross section, a generally circular wire spring with oppositely flattened sides, and a generally circular wire spring having a plurality of radially raised sections. The configuration having radially raised sections can only be used with a discontinuous spring. The operation of this synchronizer is similar to that with a conventional arrangement of struts and springs.

MODES FOR CARRYING OUT THE INVENTION

Figure 1:
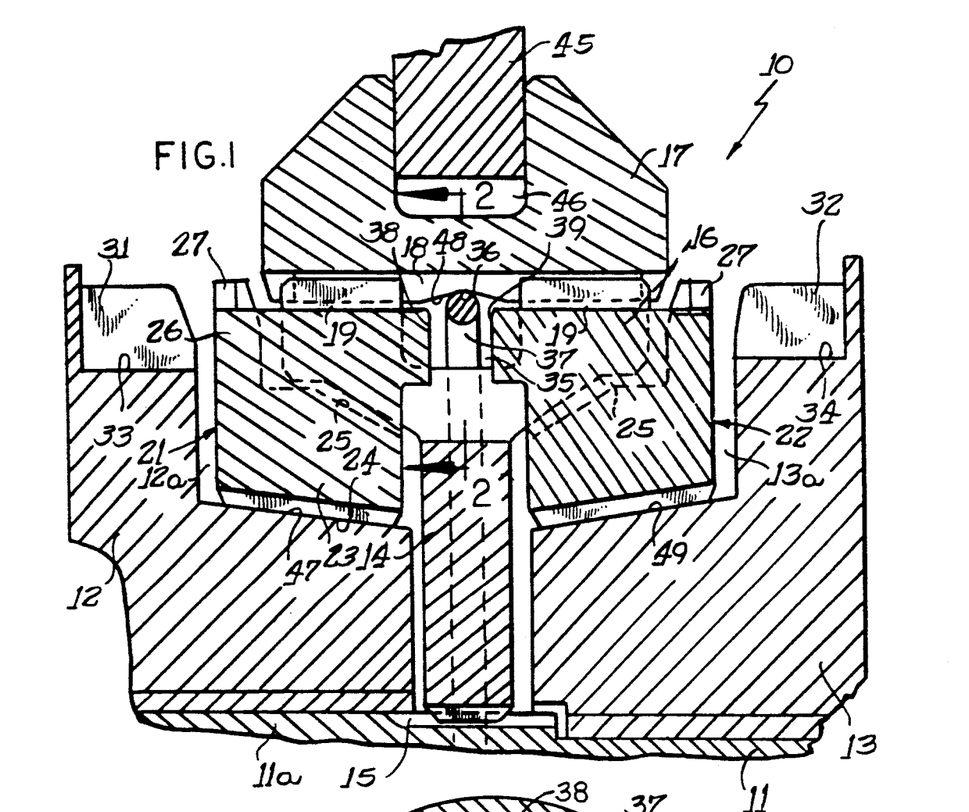
FIG. 1 is an enlarged partial cross sectional view of a first embodiment of transmission synchronizer utilizing a simplified wire spring construction of the present invention.

Referring more particularly to the disclosure in the drawings, wherein are shown illustrative embodiments of the present invention, FIG. 1 discloses an enlarged view of a portion of a first embodiment of an improved synchronizer assembly 10 according to the present invention which is mounted on a driven shaft 11 of a transmission (not shown). A pair of gears 12 and 13 is journalled on the shaft 11 on the opposite sides of the synchronizer 10. An internally splined hub 14 is secured onto the shaft 11 through a splined portion 15 on an enlarged portion 11a of the shaft encompassed by the gear 12 and extends outwardly to terminate in an enlarged ring 16. An axially movable sleeve or collar 17 is positioned radially outwardly of the outer ring 16 and is internally splined at 18 to engage exterior splines 19 on the ring 16 so as to rotate with but to move axially in either direction relative to the hub.

On the opposite sides of the hub 14 and within recesses 12a and 13a of the gears 12 and 13, respectively, are positioned two blocker rings 21 and 22, each blocker ring having a main body 23 with an internal tapered surface 24 and an outer recess 25 complementary to and receiving one side of the enlarged ring 16 of the hub. The recess 25 defines a radial flange 26 on the blocker ring body which terminates in axial teeth 27 generally in line with but not normally in engagement with the spline tooth spaces of the sleeve 17.

Centrally located in the outer surface of the hub ring 16 is an annular groove or channel 35 radially aligned with a central annular groove 36 in the interior surface of the sleeve 17, the aligned facing grooves 35 and 36 receiving a single generally circular spring 37 therein. Also, each blocker ring 21 and 22 has a plurality of circumferentially spaced projections 38 and 39 extending axially inwardly into aligned axial notches 41 in the hub 14 to a position in close proximity to the wire spring. These projections are accurately positioned relative to the angular position of the teeth, such that the center of a blocker ring projection or tab is aligned with the center of a tooth 27. The notch 41 that each projection 38 or 39 fits into is also accurately positioned to be aligned with the center of a tooth 18 and further, the angular clearance between the two is critical to synchronization of the unit. Thus, the angular overtravel of the projection or tab 38 or 39 is slightly less than the pitch of the teeth 18.

Figure 2:
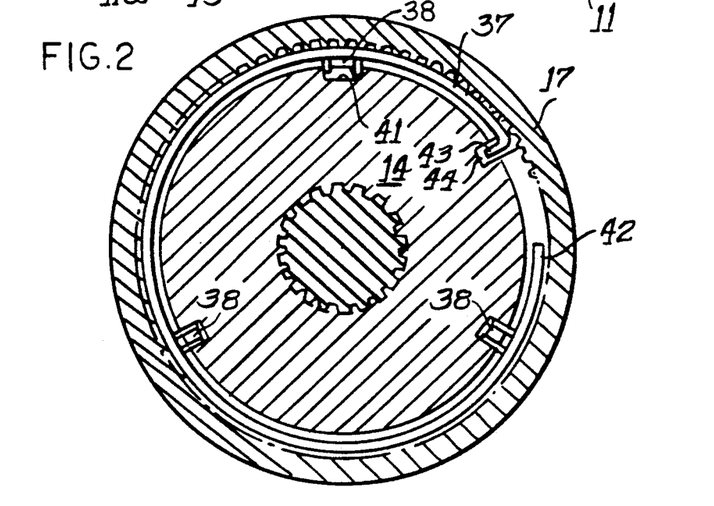
FIG. 2 is a partial cross sectional view on a reduced scale compared to FIG. 1 and taken on the line 2—2 thereof.

As seen in FIG. 2, the spring 37 is discontinuous terminating, in one free, arcuate end 42 and having a bent opposite end or tang 43 received in a notch 44 formed in the hub at a position intermediate of the projection notches.

The wire spring 37 is compressed radially in the synchronizer assembly and is positioned within the groove 35 in the hub 14. The sleeve 17 is then assembled over the hub 14 and spring 37, the spring's preload causing it to snap into the internal groove 36 in the sleeve. The groove 35 in the hub is for clearance only, and is sufficiently wide to allow the wire spring to move axially a sufficient distance to allow for proper operation of the synchronizer.

The operation of this synchronizer with the single wire spring 37 is similar to that of a conventional arrangement of struts and springs. As the sleeve 17 is moved axially to the left by a shift fork 45 (see FIG. 1) in an external annular groove 46 in the exterior surface of the sleeve 17, the wire spring 37 moves with the sleeve due to the spring's own radial tension holding it in the groove 36 therein. The side of the wire spring contacts the projections 38 on the blocker ring 21 and urges the blocker ring to its seated position with the conical friction surface 24 engaging the complementary conical friction surface 47 on the gear 12 to promote rotation of gear 12 with the driven shaft. Continued axial movement of the sleeve compresses the wire spring 37 radially, since the spring is prevented from further axial movement by abutting the stationary blocker ring. The groove 36 in the sleeve is provided with sloping sides 48 to allow the spring to be gradually radially compressed upon axial movement of the sleeve. The additional movement of the sleeve causes the teeth 18 of the sleeve to engage the teeth 27 on the flange 26 of the blocker ring. This indexes the blocker ring tangentially, causing the blocker ring teeth with their leading edge chamfers to become misaligned with respect to the internal teeth in the sleeve. Continued movement of the sleeve causes the blocker ring to rotate slightly to allow the teeth 18 of the sleeve to pass through the tooth spaces between the teeth 27 and engage the teeth 31 on the shoulder 33 of the gear 12, resulting in rotation of the hub 14, sleeve 17, blocker ring 21 and gear 12 with the driven shaft 11. Obviously, movement of the sleeve in the opposite direction will move the wire spring 37 against the projections 39 on the opposite blocker ring 22 so that blocker ring will engage the conical friction surface 49 of the opposite gear 13 to promote indexing of the blocker ring and rotation of that gear with the driven shaft.

Figure 6:
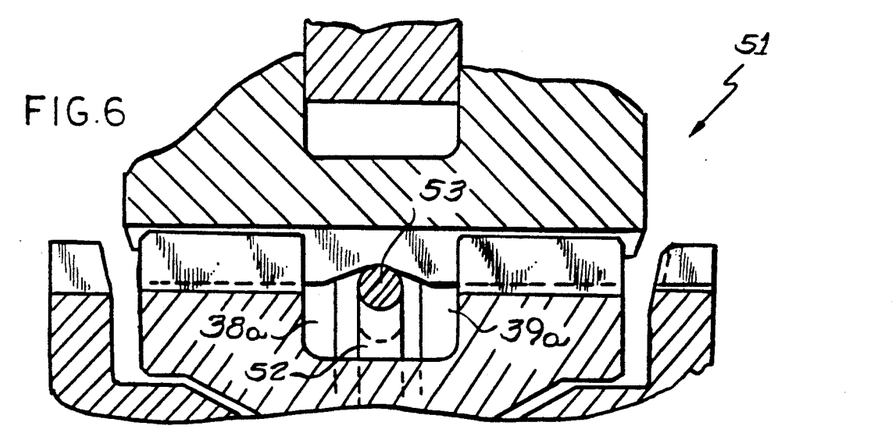
FIG. 6 is an enlarged partial cross sectional view similar to FIG. 1 but showing a second configuration of the wire spring.
Figure 7:
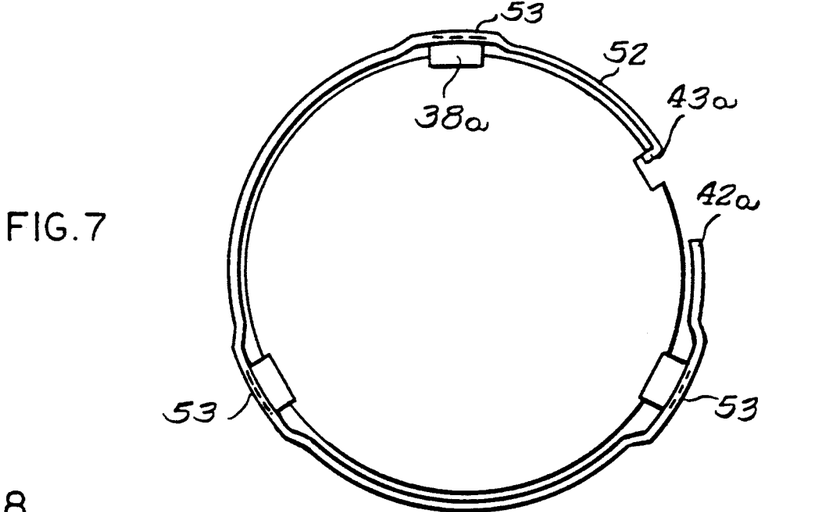
FIG. 7 side elevational view of the wire spring of FIG. 6 on a reduced scale and taken in the same direction as FIG. 2.

As seen in FIGS. 1 and 2, the discontinuous wire spring has a generally circular configuration with the wire having a circular cross section. However, this is not the only shape that will be functional with the sleeve 17 and blocker rings 21 and 22. FIGS. 6 and 7 disclose a second synchronizer 51 similar in all ways to that shown in FIGS. 1 and 2 except for the shape of the wire spring. Like parts in this configuration will be assigned the same reference numeral as in FIG. 1 with the addition of a script "a". The wire spring 52 in this assembly is generally circular with a generally curved end 42a and a bent tang 43a. It has a plurality of raised sections 53 corresponding in number to and generally aligned with the blocker ring projections 38a and 39a, which will yield a different force characteristic on the blocker ring upon continued axial movement of the sleeve than the purely circular version. This different characteristic for the second spring enables the synchronizer to be tuned to for the desired shift feel and characteristics. The overall configuration and operation of this embodiment of the wire spring is the same in any case.

Figure 8:
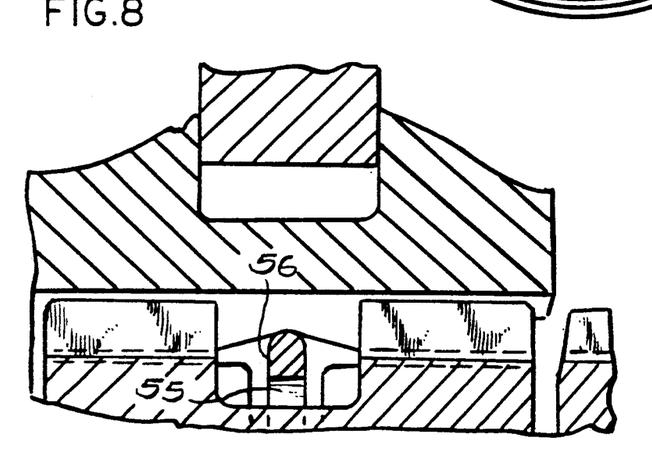
FIG. 8 is an enlarged partial cross sectional view similar FIG. 1, but showing a third configuration of the wire spring.

FIG. 8 discloses a third configuration of the wire spring 55 for the synchronizer wherein the wire spring is provided with flattened sides 56 to provide better contact with the projections on each blocker ring.

Figure 3:
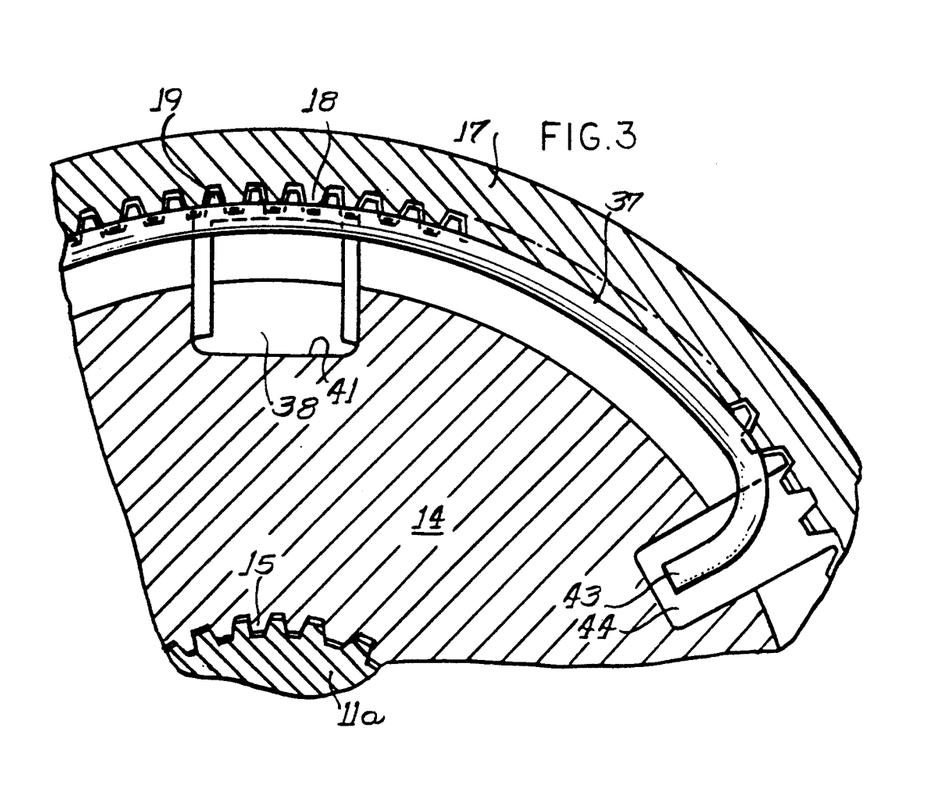
FIG. 3 is an enlarged partial cross sectional view of a portion of FIG. 2 showing the construction of the spring, hub and blocker ring in more detail.
Figure 4:
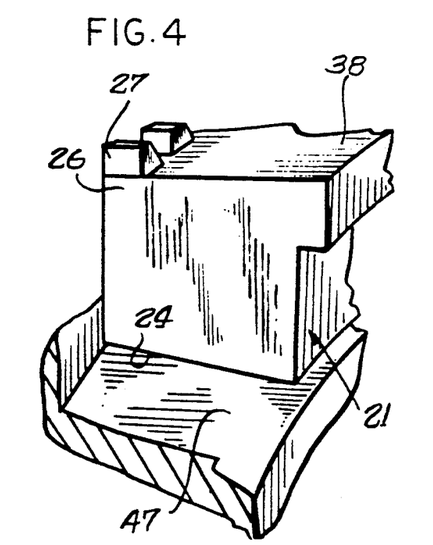
FIG. 4 is a partial perspective view of a portion of a blocker ring showing the detail of a projection thereon.
Figure 5:
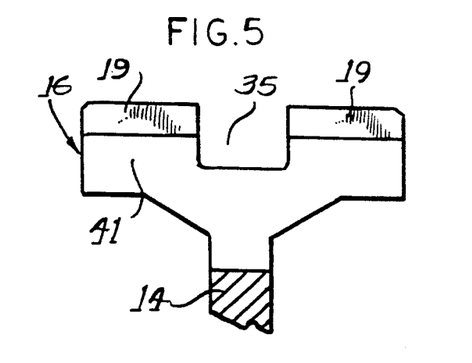
FIG. 5 is a partial cross sectional view of the synchronizer hub showing the groove for the spring and the notches to receive the blocker ring projections.
Figure 9:
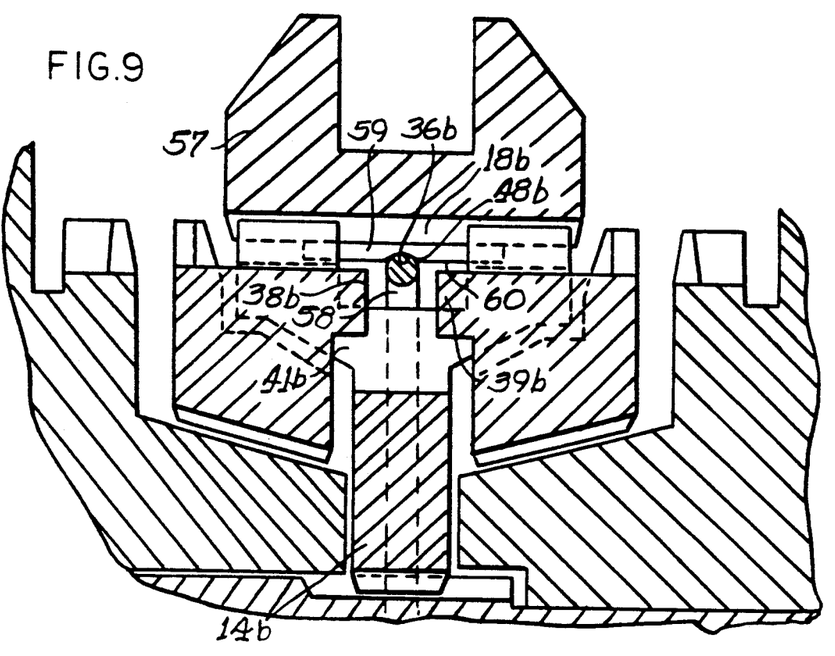
FIG. 9 is an enlarged partial cross sectional view similar to FIG. 1, but showing a second embodiment of the present invention.

FIG. 9 discloses a portion of a second embodiment of the present invention, where the wire spring is a continuous circular wire. Thus it does not include the end 42 nor tang 43 as shown in FIGS. 2 and 3. Additionally, the notch 44 also has been omitted. Like parts in this embodiment will be assigned the same reference numerals as in FIG. 1 with the addition of the script "b". The wire spring 58 in this assembly is a continuous circular ring with no projections or raised sections. The sleeve 57 is provided with three or more sets of inwardly extended teeth 59 corresponding to and axially aligned with the blocker ring projections 38b and 39b. The remainder of the internal teeth 18b occupy the portions of the internal diameter of sleeve 57 between the sets of extended teeth 59. A groove or notch 36b is provided in the inwardly facing surface 60 of extended teeth 59, and is provided with sloping sides 48b similar to the groove 36 in FIG. 1.

In assembly, the spring 58 is engaged with the groove in the hub 14b along one side and progressively deformed elastically to engage the remainder of the groove in the hub. The spring is then radially compressed in the areas of the notches 41b in the hub, and the sleeve 57 is then assembled axially in the usual manner.

Figure 11:
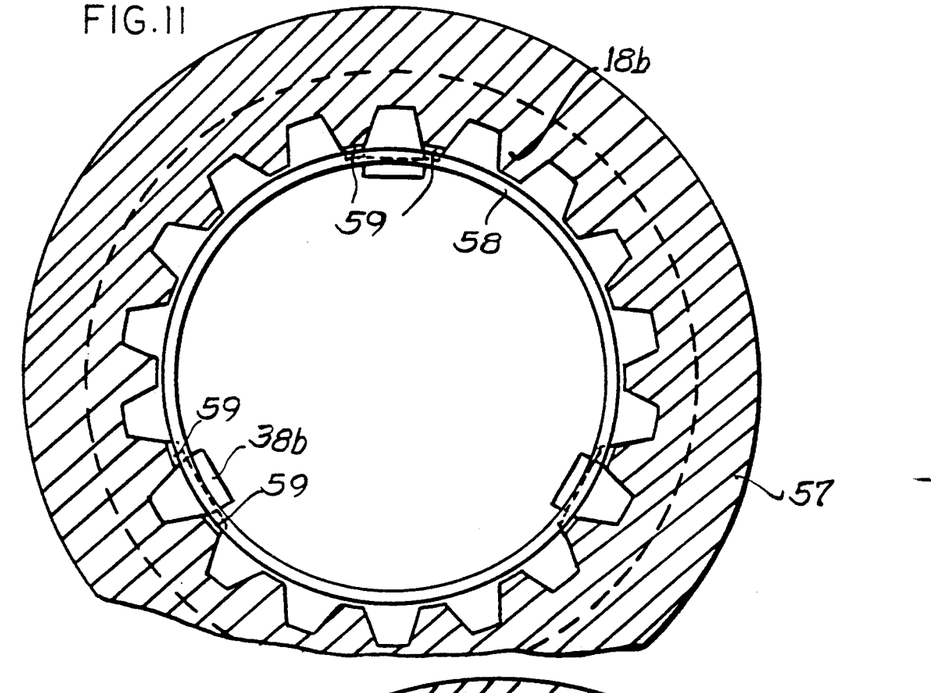
FIG. 11 is a partial cross sectional view similar to FIG. 2 showing the construction of the circular spring sleeve of the embodiment of FIG. 9.
Figure 12:
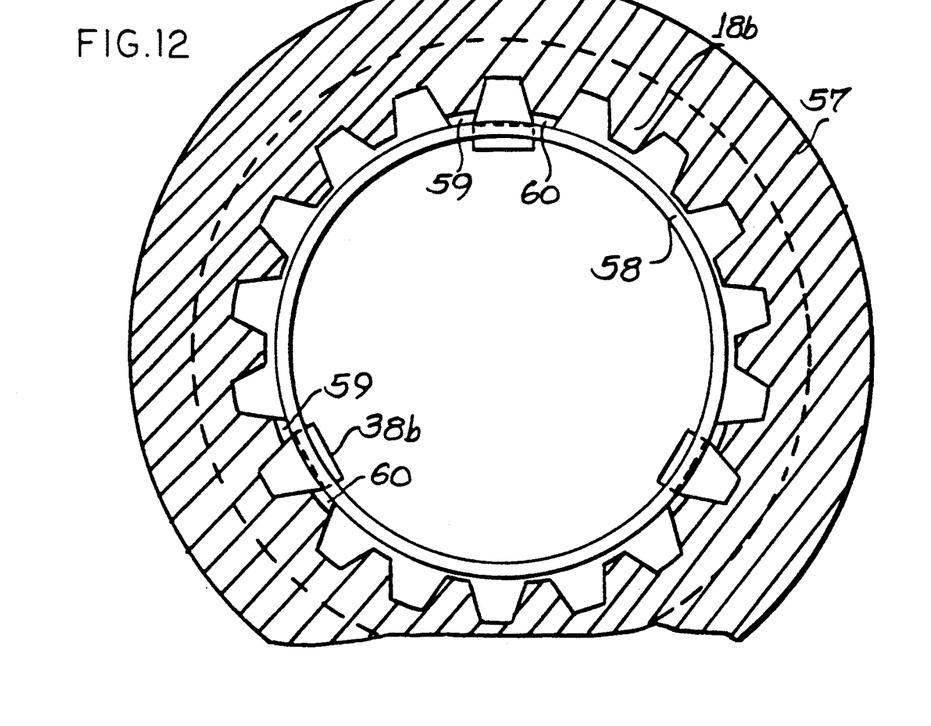
FIG. 12 is a view similar to FIG. 11 showing the spring and sleeve in a position during operation of the synchronizer.

Referring to FIG. 11, the outside diameter of spring 58 is smaller that the diameter formed by the innermost surfaces of the teeth 18b in the sleeve. The spring's preload retains it in the groove 36b in the sleeve with the outside diameter of the spring spaced inwardly away from the inner surfaces of teeth 18b. As the sleeve 57 is moved axially, the spring 58 moves with it until the spring abuts the blocker ring projections 38b, urging the blocker ring toward the gear as described previously. Continued movement of the sleeve forces the spring 58 to deform inwardly along groove sides 48b to a position as shown in FIG. 12. The spring is compressed radially inward by the surfaces 60 of teeth 59 and is forced to expand radially outward in the areas between the teeth 59. Sufficient clearance is provided between the outer periphery of the spring and the innermost surfaces of teeth 18b to allow for this expansion. Continued movement of the sleeve causes the synchronizer assembly to complete it's operation in the usual manner.

Figure 10:
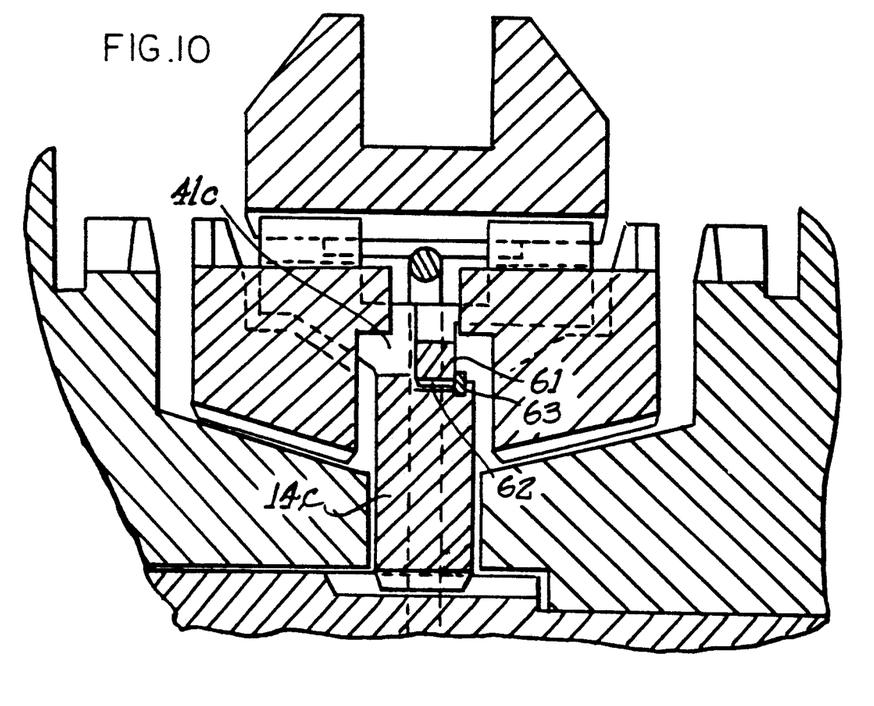
FIG. 10 is an enlarged partial cross sectional view similar to FIG. 9, but showing an alternate construction of the hub structure of the second embodiment.

FIG. 10 discloses an alternate construction of the second embodiment of the invention. In certain cases, insufficient clearance exists to provide for assembly of the spring to the hub by deforming the spring as described for the construction shown in FIG. 9. The alternate construction shown provides for assembly of the spring to the hub without the necessity of deforming the spring. As shown in FIG. 10, the hub is composed of a main body portion 14c forming a shoulder to provide one-half of the notch 41c in the hub ring and a secondary body portion 61 forms the opposite half of the hub ring and central notch. A splined connection 62 holds the parts in rotational relationship, and the connection is secured by means of a retaining ring 63 in a suitable groove in the hub body 14c preventing axial movement of the portion 61. In assembly, the spring is first placed in position on hub 14c. Part 61 is then assembled, aligning the splines 62, and the assembly is then secured with retaining ring 63. The remainder of the assembly, and the operation of the synchronizer are identical to those constructions described previously.

Figure 13:
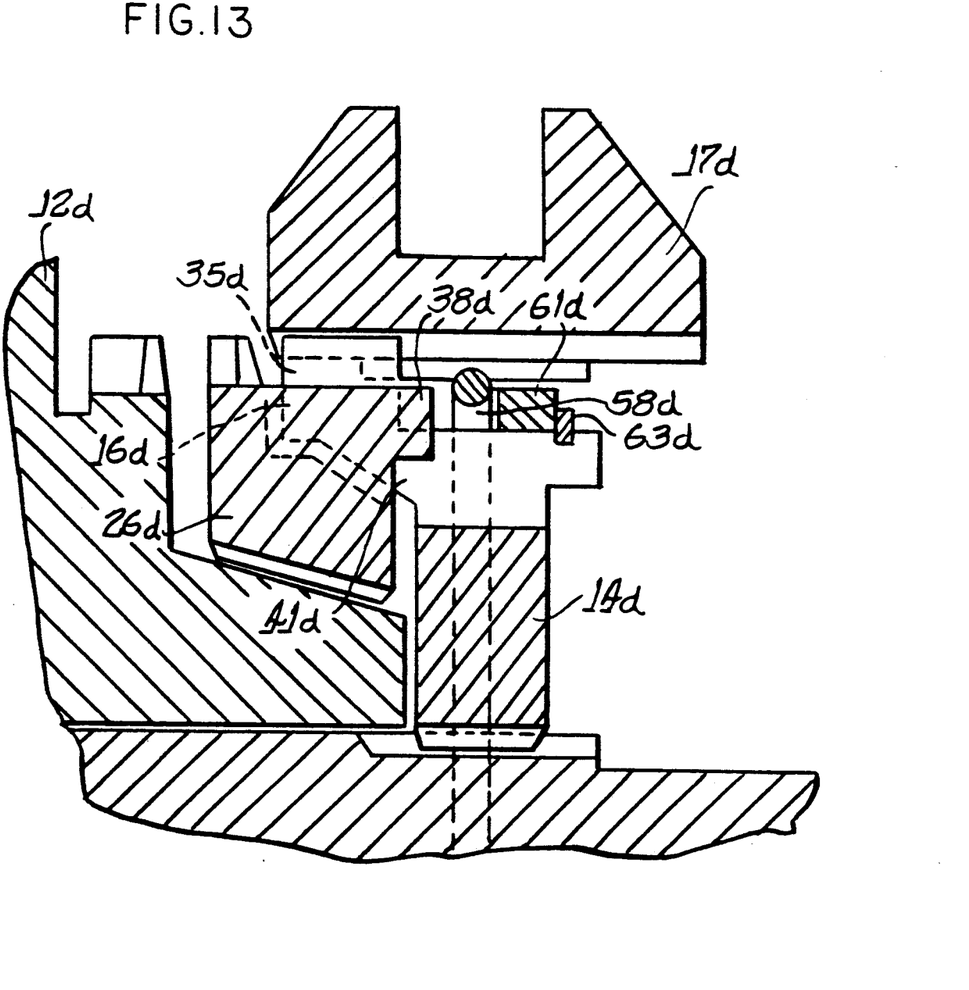
FIGURE 13 is an enlarged partial cross sectional view similar to FIG. 10, but showing a further hub construction for a one-way device.

In an assembly where a synchronizer must move solely in one direction, such as in the case of the reverse gear or for a fifth gear, FIG. 13 discloses a further construction of the hub similar to that shown in FIG. 10 for these situations, like parts have the same reference numerals with a script d. In this construction the hub 14d is provided with an outer partial annular ring 16d extending into a shoulder formed in the blocker ring 26d, the ring and hub having a plurality of notches 41d to receive inwardly extending blocker ring projections 38d. A shoulder 35d forms a notch to receive the spring 58d but it is open on the opposite side to receive an annular ring 61d retained in place by a retaining ring 63d. This construction operates in a manner similar to the previous embodiments except that movement of the sleeve 17d is only in the one direction to actuate the synchronizer and engage the gear 12d.

Although the continuously circular wire spring in the second embodiment of the present invention has been illustrated as a round cross-section, a cross-section with flattened sides, similar to that shown in FIG. 8, may be used.

INDUSTRIAL APPLICABILITY

The present invention finds application in the field of automotive vehicle transmissions, specifically in the manual transmission in a vehicle drivetrain between the engine and drive wheels.

I claim:

1. A synchronizer assembly for use in manual transmissions for automotive vehicles including a slidable clutch sleeve having a central opening with internal clutch teeth, a hub located radially inwardly of said sleeve and having a peripheral surface with axial external splines thereon, at least one blocker ring adjacent to an axial side of said hub, said blocker ring having external teeth, said hub being operatively connected to a driven shaft, at least one transmission gear journalled on said shaft on an axial side of said hub and axially spaced from said blocker ring, said gear having external clutch teeth, said hub, blocker ring, gear and clutch sleeve encompassing said driven shaft, said blocker ring and gear having complementary conical friction surfaces adapted to be engaged upon axial movement of said sleeve, said sleeve having internal axial spline teeth slidably engaging said external hub splines and to selectively engage peripheral teeth on at least one blocker ring and teeth on at least one gear, and a shift fork operatively engaging said sleeve;

the improvement comprising an annular central groove in said central opening of said sleeve, said groove facing said peripheral surface of said hub, and a generally circular wire spring located in said groove, said spline teeth having a detent groove, said wire spring being adapted to engage said detent groove whereby a thrust force is imparted to said blocker ring upon axial movement of said sleeve as said wire spring engages said blocker ring.

2. A synchronizer assembly as set forth in claim 1 in which said blocker ring has a plurality of circumferentially spaced projection extending axially into said hub.

3. A synchronizer assembly as set forth in claim 2 in which said hub has a plurality of axially extending peripheral notches aligned to receive said blocker ring projections.

4. A synchronizer assembly as set forth in claim 2 wherein said blocker ring projections are adapted to be selectively engaged by said spring when said sleeve is shifted in an axial direction.

5. A synchronizer assembly as set forth in claim 1 wherein said wire spring is discontinuous and terminated in a tang at one end, said hub including an annular notch in said peripheral surface to receive said spring and a notch in said hub to receive said spring tang.

6. A synchronizer assembly as set forth in claim 5 wherein said groove in said clutch sleeve is formed with intersecting sloping surfaces on the interior surface thereof to receive said wire spring.

7. A synchronizer assembly as set forth in claim 6 in which said sloping surfaces act to radially compress said wire spring upon axial movement of said clutch sleeve.

8. A synchronizer assembly as set forth in claim 5 wherein said wire spring is generally circular and has a round cross section, said spring having a free end and a fixed end tang carried on said fixed end.

9. A synchronizer assembly as set forth in claim 5 wherein said wire spring has a plurality of circumferential, equally spaced, raised sections, said raised sections being adapted to engage said blocker ring projections to produce an axial force on said blocker ring.

10. A synchronizer assembly as set forth in claim 5 wherein said wire spring has opposite flattened axial sides acting to engage said projections on the blocker rings.

11. A synchronizer assembly as set forth in claim 1 wherein said wire spring is a continuous, generally circular member.

12. A synchronizer assembly as set forth in claim 11 wherein a portion of said sleeve is provided with sets of internal secondary spline teeth corresponding to and axially aligned with said blocker ring projections, the diameter of said secondary axial teeth being smaller than the diameter of the remaining teeth on said sleeve.

13. A synchronizer assembly as set forth in claim 12 wherein the outer diameter of said wire spring is smaller than the innermost diameter of said remaining teeth but slightly greater than the inner diameter of said secondary teeth.

14. A synchronizer assembly as set forth in claim 13 wherein said sleeve is adapted, upon axial movement, to cause said wire spring to abut said blocker ring projections, said wire spring then being compressed by said secondary teeth upon further movement of said sleeve.

15. A synchronizer assembly as set forth in claim 11 wherein said hub is a solid annular member having an annular peripheral notch to receive said spring.

16. A synchronizer assembly as set forth in claim 11 wherein said hub has a shoulder at a radial outward location forming a portion of an annular notch for said spring, a secondary annular ring fitting on said shoulder to complete said notch, and a retaining means for retaining said secondary portion on said hub.

17. A synchronizer assembly as set forth in claim 16 wherein said hub and secondary ring have complementary portions interconnecting said hub and said secondary ring for rotation together.

18. A synchronizer assembly as set forth in claim 11 in which said wire spring has a generally round cross section.

19. A synchronizer assembly as set forth in claim 11 in which said wire spring has flattened axial sides adapted to engage said projections on said blocker rings.

20. A synchronizer assembly as set forth in claim 17 including only one blocker ring and one gear, said sleeve engaging said one blocker ring when it is shifted in one axial direction and disengaging said one blocker ring when it is shifted in the opposite axial direction.

* * * * *

UNITED STATES PATENT AND TRADEMARK OFFICE
CERTIFICATE OF CORRECTION

PATENT NO. : 5,269,400
DATED : December 14, 1993
INVENTOR(S) : Mark J. Fogelberg It is certified that error appears in the above-indentified patent and that said Letters Patent is hereby corrected as shown below:

Column 2, line 16, after "position", delete ". The" and substitute --on the--
Column 2, line 17, after "portion" delete "the" and substitute --. The--.
Column 2, line 51, after "FIG. 7" insert --is a--.
Column 2, line 64, after "spring" insert --and--.
Column 4, line 58, after "tuned" delete "to".
Column 5, line 67, after "situations" delete ", like" should read --. Like--.
Column 6, line 55, Claim 2, after "spaced" delete "projection" and substitute --projections--.

Signed and Sealed this

Sixteenth Day of August, 1994

Attest:

BRUCE LEHMAN

Attesting Officer         Commissioner of Patents and Trademarks